(12) United States Patent
Keim et al.

(10) Patent No.: US 10,007,692 B2
(45) Date of Patent: Jun. 26, 2018

(54) PARTITION FILTERING USING SMART INDEX IN MEMORY

(71) Applicant: MICROSOFT TECHNOLOGY LICENSING, LLC, Redmond, WA (US)

(72) Inventors: Rob Keim, Paris (FR); Karim Jouini, Paris (FR); Frederic Girard, Paris (FR); Wassim Jouini, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 577 days.

(21) Appl. No.: 14/226,866

(22) Filed: Mar. 27, 2014

(65) Prior Publication Data

US 2015/0278278 A1 Oct. 1, 2015

(51) Int. Cl.
*G06F 17/30* (2006.01)
(52) U.S. Cl.
CPC .. *G06F 17/30345* (2013.01); *G06F 17/30312* (2013.01); *G06F 17/30321* (2013.01); *G06F 17/30442* (2013.01)
(58) Field of Classification Search
CPC ......... G06F 17/30345; G06F 17/30312; G06F 17/30321; G06F 17/30442; G06F 17/30457; G06F 17/30339
See application file for complete search history.

(56) References Cited

U.S. PATENT DOCUMENTS 7,340,445 B2 * 3/2008 Cunningham .... G06F 17/30451
9,348,890 B2 * 5/2016 Larson .............. G06F 17/30398
2008/0126311 A1 * 5/2008 Rowley ............. G06F 17/30474
2010/0191764 A1 * 7/2010 Aluf-Medina .... H04L 29/06027
707/769
2012/0084278 A1 * 4/2012 Franke .............. G06F 17/30587
707/719
2012/0303628 A1 * 11/2012 Silvola ............. G06F 17/30339
707/741

(Continued)

OTHER PUBLICATIONS

"Partitioning Concepts," from Oracle® Database VLDB and Partitioning Guide 11g Release 1. 2007. Accessed Feb. 3, 2017 from <http://web.archive.org/web/20130801202417/http://docs.oracle.com/cd/B28359_01/server.111/b32024/partition.htm>.*
"Second Written Opinion Issued in PCT Application No. PCT/US2015/022100", dated Feb. 26, 2016, 10 Pages.

(Continued)

*Primary Examiner* — Robert W Beausoliel, Jr.
*Assistant Examiner* — Arthur Ganger
(74) *Attorney, Agent, or Firm* — Shook, Hardy & Bacon, L.L.P.

(57) ABSTRACT

Example apparatus and methods detect a query to a partition in a table store that is arranged in a table-entity-property organization. A partition is a collection of entities having the same partition key value. If the query seeks to filter on a specific entity in the partition, then the partition may be copied to a memory (e.g., structured shared cache, shared memory) that is prepared with one or more indexes that facilitate filtering the partition. Example apparatus and methods may copy the partition from the table store into the memory and then filter the partition on the specific field from the memory using the one or more indexes. Filtering the partition on the specific field may proceed in parallel, perhaps massively in parallel, using all the indexes available for the memory.

20 Claims, 8 Drawing Sheets

(56) References Cited

U.S. PATENT DOCUMENTS

| | | | | |
|---|---|---|---|---|
| 2013/0266193 A1* | 10/2013 | Tiwari | ............... | G06K 9/00771 |
| | | | | 382/115 |
| 2014/0281115 A1* | 9/2014 | Biswal | ................. | G06F 12/084 |
| | | | | 711/3 |
| 2014/0379631 A1* | 12/2014 | Sebastian | .......... | G06F 17/30424 |
| | | | | 707/607 |
| 2015/0088811 A1* | 3/2015 | Hase | ................ | G06F 17/30345 |
| | | | | 707/607 |
| 2015/0095309 A1* | 4/2015 | Dees | ................ | G06F 17/30463 |
| | | | | 707/718 |
| 2015/0120745 A1* | 4/2015 | James | ............... | G06F 17/30306 |
| | | | | 707/741 |

OTHER PUBLICATIONS

Koutsouveli, "Parallel computing", Retrieved from «https://en.wikipedia.org/wiki/Parallel_computing», Mar. 18, 2014, 17 Pages.

"Attribute-value pair", Published on: Apr. 20, 2013 Available at: https://en.wikipedia.org/w/index.php?title=Attribute-value_pair&oldid=551268453.

"Serialization", Published on: Mar. 24, 2014 Available at: https://en.wikipedia.org/w/index.php?title=Serialization&oldid=501085754.

"International Search Report and Written Opinion Issued in PCT Patent Application No. PCT/US2015/022100", dated Jun. 10, 2015, 13 Pages.

"International Preliminary Report on Patentability Issued in PCT Application No. PCT/US2015/022100", dated Jun. 24, 2016, 11 Pages.

* cited by examiner

PARTITION FILTERING USING SMART INDEX IN MEMORY

BACKGROUND

A structured query language (SQL) database model depends on tabular relationships in a relational database. NoSQL, which stands for "not only" SQL, refers to an approach for storing and retrieving data that does not use the SQL model. A NoSQL model may use key-value pairs in entities in a table storage that is optimized for retrieval and appending. Optimizing for one action may cause other actions to have sub-optimal performance. A key-value store allows data to be stored in a schema-less way in, for example, an object (e.g., binary large object (BLOB)). Table storage systems may be built on a BLOB and NoSQL framework. Like all data structures and organizations, a table storage system may work well for one type of operation but may not work as well for another type of operation.

A table storage system may store large amounts of data using a NoSQL database. The data may be, for example, unstructured data. The data may also be, for example, structured but non-relational data. A table storage system may be optimized for storing structured, non-relational data. A table storage system may store tables. A table may be considered to be a collection of entities. An entity corresponds roughly to a schema-less database record. A table can store different entities with different sets of properties. One property may be a partition key that facilitates grouping items into partitions or collections. A table may have multiple "partitions", where a partition is defined as entities that have the same value for their partition key. Within a partition there may be different entities with different sets of properties. An entity may be considered to be a set of properties. In an object-oriented system, an entity may map to an object using, for example, a custom class. Adding an entity to a table may involve creating a class that defines the properties (e.g., name-value pairs) of the entity. A property may be defined as a name-value pair. A table may impose no schema requirement on an entity, even though an entity may have a partition key and a row key. The row key may be a unique identifier for an entity in a partition.

Different types of queries may seek different types of data from a table. For example, a first query may seek to retrieve all entities in a partition while a second query may seek to retrieve only some entities in a partition. One query may seek data about people with a last name "Smith" and then a subsequent query on the set of entities returned by the previous query may seek data about the people named Smith whose first name comes before "John." Another query may get data about all the people with a certain partition key (e.g., last name "Smith") and a certain row key (e.g., first name "John"). The table-entity-property organization for partitions with partition keys may optimize certain operations but may be challenged to support other operations. For example, filtering a partition on a specific field (e.g., property name) other than the partition key or row key may be a challenge.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards improving filtering on a specific field in a table stored in a table store using a table-entity-property organization. The term "field" as used herein refers to a property, where a property is a name-value pair. The term "filtering" as used herein refers to retrieving a particular subset of entities found in a partition of a table. Conventionally, to filter on a specific field, a table store may have first scanned the entire partition and then filtered on the specific field. The scanning and filtering may have happened each time a query sought data associated with a specific field. The degree of the sub-optimality of filtering on a specific field may have varied directly with the size of a partition in which the filtering was performed.

Example methods and apparatus provide a memory (e.g., shared memory, cache, structured shared cache) for which one or more indexes may be prepared to support filtering on specific fields. The filtering will be performed in the memory instead of in the table store. A collection of entities (e.g., a partition) having a common value for their partition keys can be read from a table store into the memory and then filtered in the memory using the index(es). Rather than scan the entire partition in the table store for each query that seeks to filter on a specific field, example apparatus and methods may read a partition into the memory for which the index(es) have been prepared. The memory may be arranged so that one or more fields can be used as an index to support a query. In one example, the memory may be arranged so that any property name associated with a name-value pair in a partition may be used as an index to support a query (e.g., language integrated query, NoSQL query). The memory may also be arranged so that queries may be performed in parallel. Thus, rather than scan a partition in the table store, a first query to a partition may cause the partition to be read into the memory (e.g., structured shared cache). The filtering may then be performed on the data stored in the memory. Subsequent queries on the partition may be serviced from the memory rather than reaching back into the table store. In one embodiment, once a partition has been read into the memory, the partition can be updated in place of or in addition to updating the partition in the table store.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods provide a different approach for filtering a partition on a specific field when the partition is associated with a table-entity-property organization. The partition may initially be stored in a table storage system. The table storage system may include one or more data stores. The partition may be moved to a memory that supports having one or more indexes available for filtering the partition. The memory may be, for example, a shared memory or cache. The memory may be a data store located outside the table storage system.

A table storage system may store large amounts of structured but non-relational data using a table-entity-property organization. The data may be stored in a table using, for example a binary large object (BLOB). A table may be a collection of entities. An entity in a table may correspond roughly to a database record. A property in an entity may correspond roughly to a field in a database record, where a field may have a name and a value. Tables may be accessible from many locations including a mobile device via, for example, a representational state transfer (REST) application programming interface (API). Queries may be presented to the table storage system using the REST interface.

Some users may want to filter a partition by specific fields. Conventional table storage systems that are built on a table-entity-property and BLOB framework may be challenged by this operation. For example, a conventional system may scan the entire partition in the table storage system and then filter on the field. This may be done for every query on the partition that seeks to filter on a field. This may be inefficient in terms of time, processor cycles, input/output operations, and other machine performance parameters.

Figure 1:
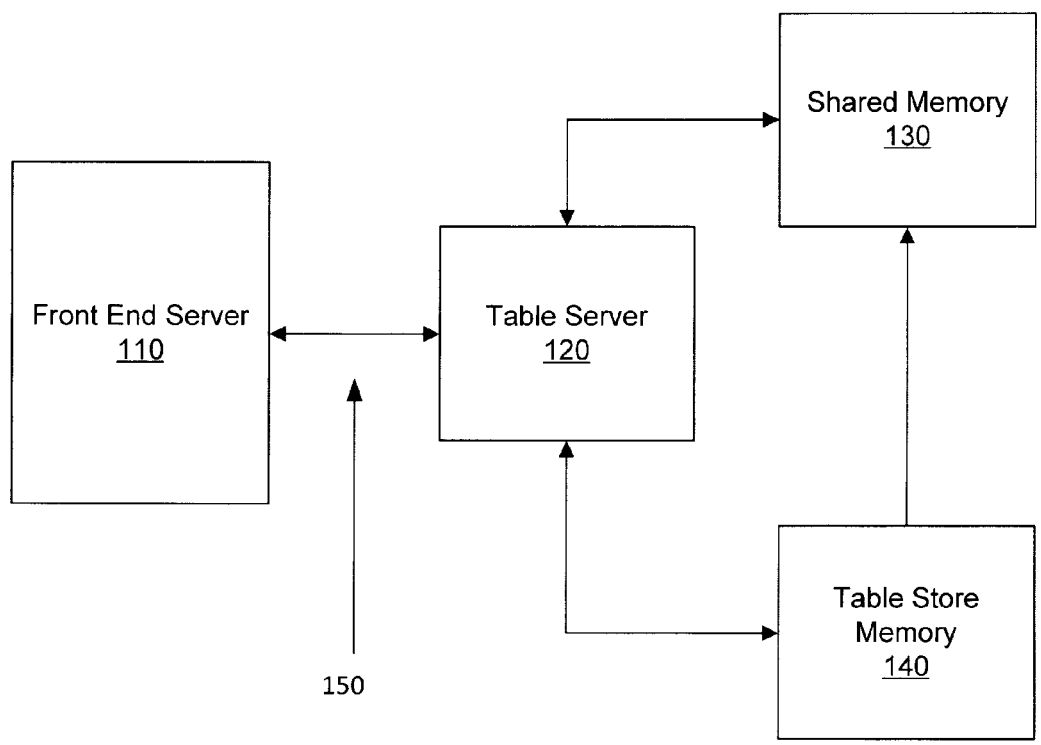
FIG. 1 illustrates an example system for filtering a partition on a specific field using a smart index in memory.

Example apparatus and methods operate differently than conventional systems. Rather than filter in the table store without the benefit of partition specific indexes, example apparatus and methods may prepare partition specific and even query specific indexes and copy a partition into memory where it is filtered using those indexes. FIG. 1 illustrates a front end server 110 that may produce a query. The query may be designed to filter a partition on a specific field. The query may be presented to a table server 120. The front end server 110 may be located on one side of a high latency link 150 (e.g., network link) and the table server 120 may be located on another side of the high latency link 150. Table server 120 may have access to both a table store memory 140 and a shared memory 130. Table server 120 may determine whether the query should be processed by accessing the table store memory 140 or by accessing the shared memory 130. Table server 120 may acquire the data that satisfies the query and return the data over the high latency link 150.

Example apparatus and methods may selectively copy a partition from the table store memory 140 to the shared memory 130 upon determining that the query seeks to filter the partition on a specific field. Example apparatus and methods may service the query from the table store memory 140 upon determining that the query does not seek to filter the partition on a specific field. Servicing the query may include, for example, returning data sought by the query. Shared memory 130 may have finite resources, therefore copying one partition into the shared memory 130 may require the removal of another partition or portion of another partition. In one embodiment, partitions may be removed from shared memory according to a least recently used policy. Other removal and replacement policies may be used.

Figure 2:
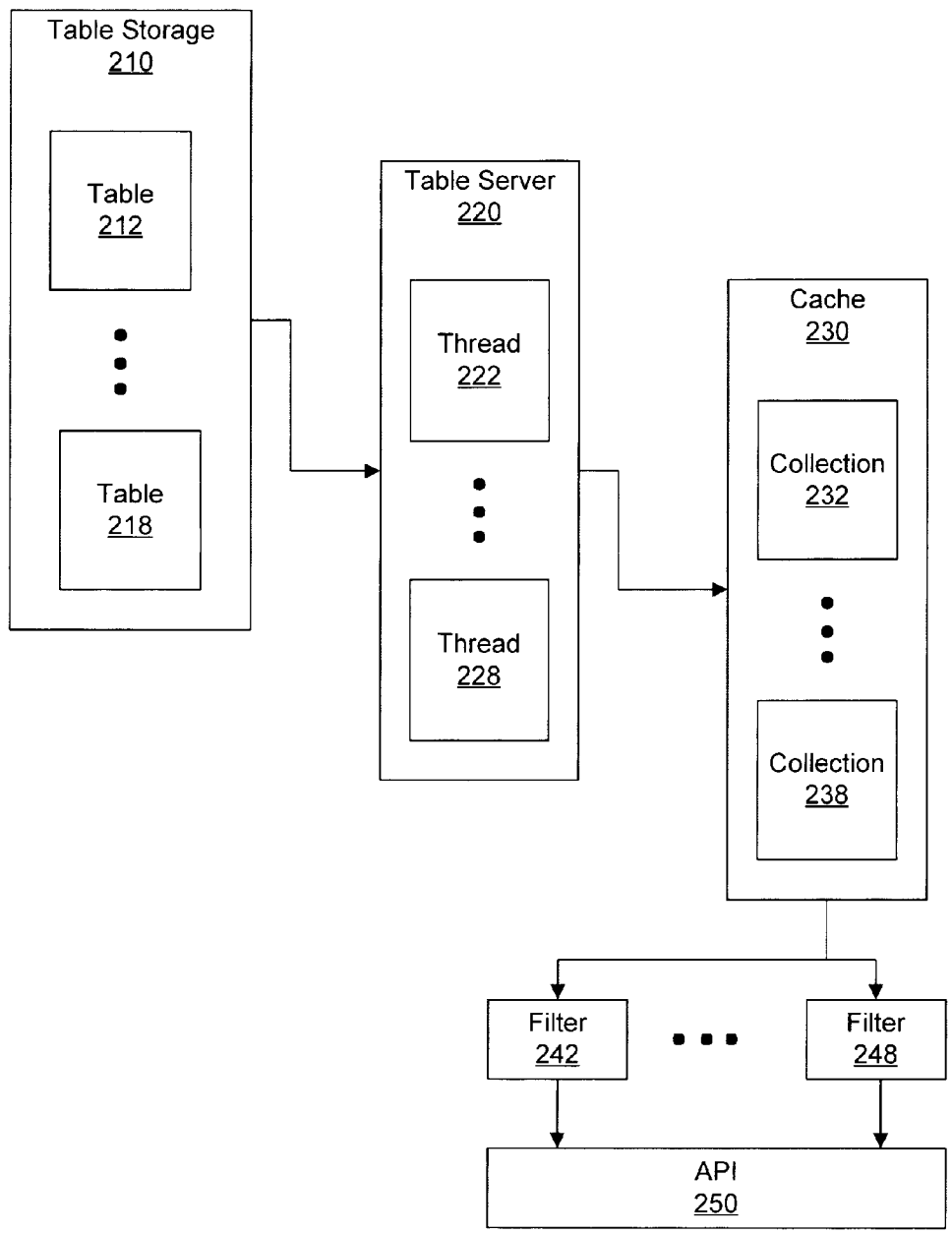
FIG. 2 illustrates an example system for filtering a partition on a specific field using a smart index in memory.

FIG. 2 illustrates table storage 210. Table storage 210 may store multiple tables including table 212 through table 218. Table storage 210 may be accessible to a table server 220. The table server 220 may be multi-threaded and thus may have threads 222 through 228. Different threads may perform different queries on different tables. Table server 220 may decide to handle different queries in different ways. Queries that do not seek to filter on a specific field may be handled from table storage 210. Queries that do seek to filter on a specific field may be handled by copying a collection from table storage 210 to cache 230. Cache 230 may be arranged so that multiple indexes are available for a collection that is stored in cache 230. Conventionally, a partition may not be able search a partition in parallel since only one or even zero indexes may be available for the partition. When multiple indexes are available for a partition in cache 230, a query that seeks to filter on a specific field may be able to proceed in parallel. Since table server 220 is multi-threaded and may process multiple queries, cache 230 may store multiple collections (e.g., collection 232 through 238). Different collections may be subjected to different filtering in response to different queries. Therefore a collection of filters 242 through 248 may operate on collections 232 through 238. The mechanics of servicing a query may be made transparent to a user that makes the query by the operation of an application programming interface (API) 250.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, or in other ways. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example method. Blocks may be combined or separated into multiple components. Furthermore, additional or alternative methods can employ additional, not illustrated blocks.

Figure 3:
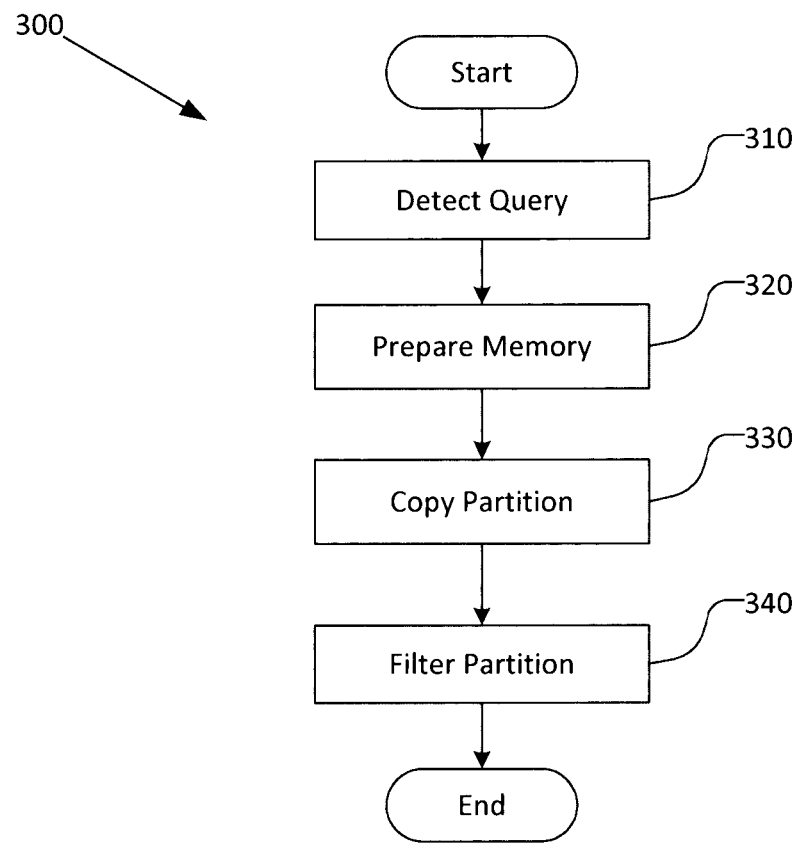
FIG. 3 illustrates an example method for filtering a partition on a specific field using a smart index in memory.

FIG. 3 illustrates an example method 300 for filtering a partition on a specific property or field using a smart index in memory. Method 300 includes, at 310, detecting a query that seeks information from a partition in a table in a table store. The query may be, for example, a NoSQL query. In one embodiment, the query may seek to filter on a specific property in the partition. The table store with which method 300 interacts may be arranged according to a table-entity-property organization or model. In this type of organization, the partition is a collection of entities in a table in the table store where members of the collection of entities have the same partition key value. In the table-entity-property organization, a table comprises a set of entities, an entity comprises a set of properties, and a property comprises a name-value pair. The table does not enforce a schema on an entity and thus the table can store different entities that have different sets of properties. Additionally, the partition may have different entities with different sets of properties. An entity may have a partition key and a row key. The partition key may be used to identify related collections of entities, and the row key may be used as a unique identifier for an entity within the partition. For example, the partition key may be used to group customers by zip code, by last name, by credit limit, or in other ways. The row key may then be used to find a particular customer in the zip code, a particular customer with the last name, a particular customer with a credit limit, or other customers. Sometimes, however, a query may seek to filter on a property (e.g., field) that is not the partition key or the row key. In this case, the partition may be copied from the table store to the memory (e.g., shared memory, structured shared memory, cache, structured shared cache) for which the smart index has been prepared.

Method 300 also includes, at 320, preparing one or more indexes that facilitate filtering the partition. The indexes may be smart indexes that may be, for example, partition-specific or query-specific. Being partition-specific means that the smart index is organized to facilitate searching for particular name-value pairs (e.g., fields) in a particular partition. Being query-specific means that the smart index is organized to facilitate searching for the particular name-value pair(s) associated with the query. Preparing the indexes may include, for example, populating a data structure, instantiating an object, populating an object, writing values to a memory, or other actions that store information from which an index can be created. In one embodiment, method 300 may include preparing the indexes or organizing the memory so that two or more properties in the partition can be used as indexes to support the query. In another embodiment, method 300 may include preparing the indexes or organizing the memory so that any property in the partition can be used as an index to support the query.

Method 300 also includes, at 330, copying the partition from the table store into the memory. Copying the partition may be performed, for example, on an entity by entity basis, using page transfers, using record transfers, by reading then writing an object, by reading then writing a portion of an object, or in other ways.

Method 300 also includes, at 340, filtering the partition on the specific property using the one or more indexes. Filtering the partition may include finding members of the partition that have a desired value for a name-value pair and returning those members or portions of those members to the user that generated the query. When two or more indexes are available, filtering the partition at 340 may proceed in parallel using selected indexes available to the memory. When indexes have been prepared or the memory has been organized so that any property can be an index, filtering the partition at 340 may proceed in parallel using all the indexes available to the memory. Since the memory may be a shared memory, multiple queries may proceed in parallel on a partition stored in the memory.

Figure 4:
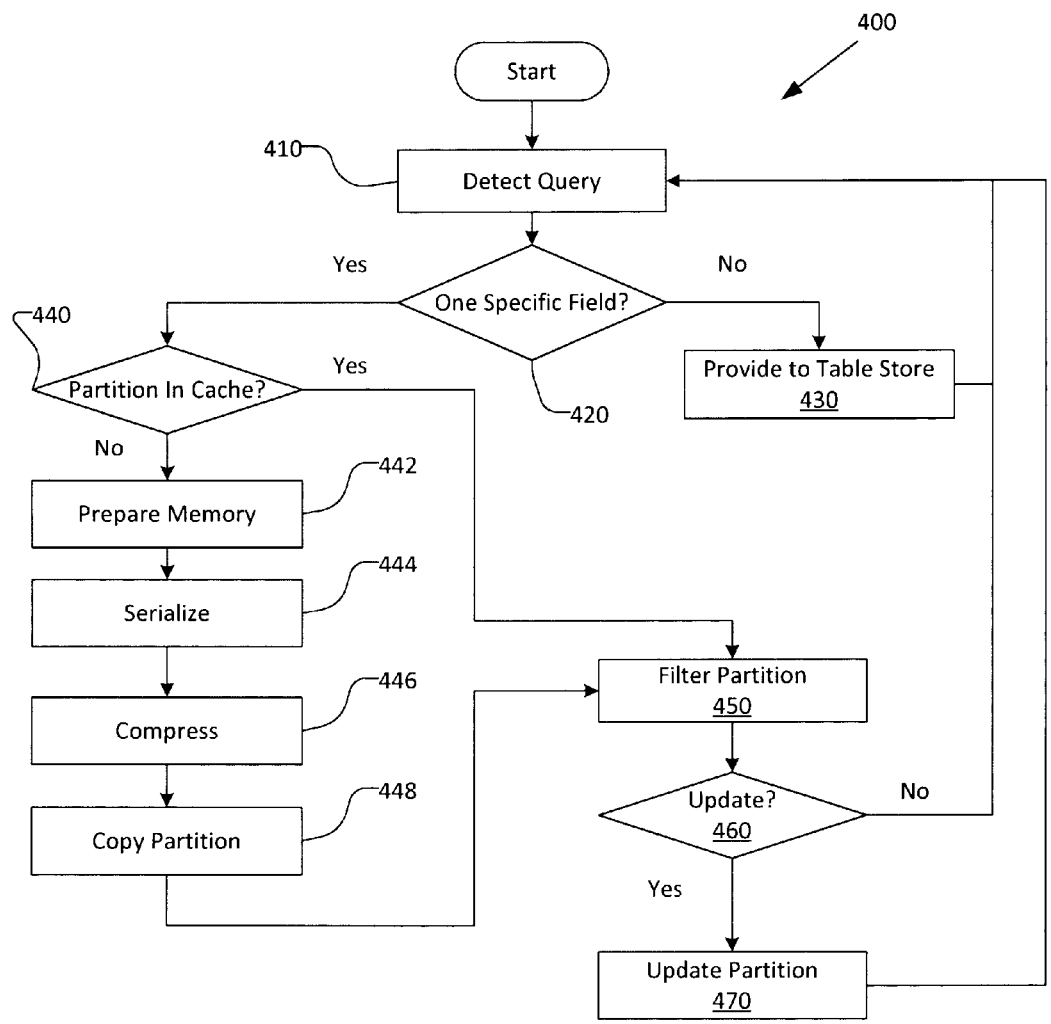
FIG. 4 illustrates an example method for filtering a partition on a specific field using a smart index in memory.

FIG. 4 illustrates an example method 400 for filtering a partition on a specific property or field using a smart index in memory. Method 400 includes several actions similar to those described in connection with method 300. For example, method 400 includes detecting a query at 410, preparing a memory (e.g., cache) at 442 (e.g., producing indexes), copying a partition at 448, and filtering a partition at 450. However, method 400 includes additional, different actions.

For example, method 400 includes, at 420, determining whether a query seeks to filter on a specific property in a partition. Upon determining that the query does not seek to filter on a specific property in the partition, method 400 may proceed, at 430, to provide the query to a table store so that the query can be serviced from the table store. Upon determining that the query does seek to filter on the specific property in the partition, method 400 may proceed, at 440, to determine whether the partition is already in the memory. If the partition is already in the memory, method 400 may proceed to 450. But if the partition is not already in the memory, then method 400 may proceed to 442.

Method 400 may include serializing the partition before, during, or after copying the partition from the table store into the memory. In one embodiment, the serializing may be performed at 444. Method 400 may also include compressing the partition before, during, or after copying the partition from the table store into the memory. In one embodiment, the compressing may be performed at 446. Compressing and serializing may be performed in different orders at different times.

Method 400 may also include selectively updating the partition in the memory or in the table store. The partition may be updated in response to, for example, an entity addition, an entity deletion, a change to a property, or other reason. Method 400 may make a determination at 460 about whether to update the partition. If the determination at 460 is no, then processing may return to 410 where the next query will be detected. But if the determination at 460 is yes, then the partition may be updated. In one embodiment, the partition may be updated in the table store and the change may be propagated to the memory. In one embodiment, the partition may be updated in the table store and the change may not be propagated to the memory. In yet another embodiment, the partition may be updated in the memory and the change may be propagated to the table store. In still yet another embodiment, the partition may be updated in both locations contemporaneously.

While FIGS. 3 and 4 illustrate various actions occurring in serial, it is to be appreciated that various actions illustrated in FIGS. 3 and 4 could occur substantially in parallel. By way of illustration, a first process could detect and route queries, a second process could selectively prepare indexes for a partition and copy the partition from a table store to a memory for which the indexes have been prepared, and a third process could filter partitions in memory using the one or more indexes prepared for the partitions. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
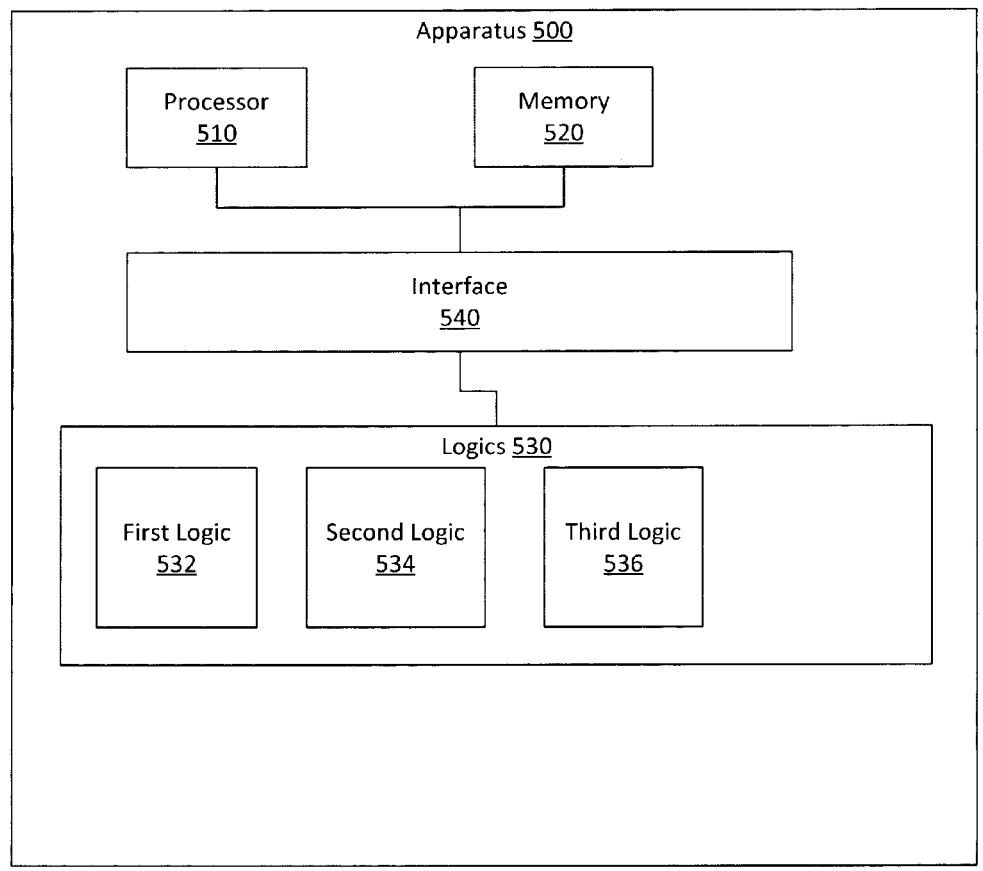
FIG. 5 illustrates an example apparatus for filtering a partition on a specific field using a smart index in memory.

FIG. 5 illustrates an example apparatus 500. In one example, the apparatus 500 includes an interface 540 that connects a processor 510, a memory 520, and a set 530 of logics. Elements of the apparatus 500 may communicate with each other, but not all connections have been shown for clarity of illustration. In one embodiment, the apparatus 500 may be a general purpose computer that has been transformed into a special purpose computer through the inclusion of the set of logics 530. Apparatus 500 may interact with other apparatus, processes, and services through, for example, a computer network.

The set 530 of logics may facilitate filtering a partition on a specific field using an index prepared for a memory. The set 530 of logics may service a query that seeks to filter on one or more specific fields in the partition. Filtering on a specific field may include retrieving "records" for which a value in a "field" comprising a name-value pair has a specific value or range of values. The partition may be stored in a table in a table store that is organized using a table-entity-property model.

The set 530 of logics may include a first logic 532 that receives and routes a query. The query may be, for example, a NoSQL query. The query may be routed as a function of whether the query seeks to filter the partition on one or more specific fields other than a row key. If the query seeks to filter the partition on one or more specific fields other than a row key, then the query may be serviced from a memory (e.g., shared memory, cache) for which an index(es) is available and to which the partition may be copied. If the query does not seek to filter the partition on one or more specific fields, then the query may be serviced from the table store. The first logic 532 selectively copies the partition from the table store into the memory upon detecting that the query seeks to filter the partition on one or more specific fields. In one embodiment, the first logic 532 routes queries that seek to filter on one or more specific fields in the partition to the third logic 536 and routes queries that do not seek to filter on one or more specific fields in the partition to the table store.

The set 530 of logics may also include a second logic 534 that prepares an index for the memory. Preparing an index may include, for example, storing values in an index data structure, manipulating a bit field, storing values in an object, or other action. The index facilitates filtering the partition on the one or more specific fields. In one embodiment, the second logic 534 may prepare two or more indexes for the partition or memory. In one embodiment, the second logic 534 prepares enough indexes so that any name associated with a name-value pair in the partition can be used as an index to service the query. In one embodiment, the second logic 534 prepares enough indexes so that the query or multiple different queries can proceed in parallel. In one embodiment, the second logic 534 selectively updates the partition. In different examples, the partition may be updated in the memory or may be updated in the table store. The partition may be updated in response to, for example, an entity insertion, an entity deletion, a change to a property value, or other reason.

The set 530 of logics may also include a third logic 536 that filters the partition in the memory on the one or more specific fields. Filtering the partition may include retrieving information from entities that have specific values for properties stored as name-value pairs. In one embodiment, the third logic 536 filters the partition in parallel using the two or more indexes. Filtering the partition may include retrieving entities based on the value associated with a specific name-value pair. For example, while a partition may include entities that all share the same value for their partition key, different entities in the partition may have different name-value pairs and may have different values for name-value pairs. Consider a table that stores customer records that are partitioned on zip codes. A query may seek to find all people who purchased a certain item (e.g., disposable diapers) in a certain zip code. Not all entities in the partition may have made any purchases at all and thus not all entities may have a name-value pair corresponding to a purchase. Once people in a particular partition (e.g., zip code 44113) have been found, the partition may be copied to the memory. The partition may then be filtered on two specific fields, with the filtering proceeding in parallel. For example, the query may filter for people who have the desired name-value pair (e.g., made a purchase) and the desired value(s) for the name-value pair (e.g., purchased disposable diapers). The query may also seek to filter on another specific field (e.g., number of purchases in relevant time frame) to find people who have made more than a threshold number of purchases. The presence of the multiple indexes may allow the query to proceed in the memory in parallel, providing superior performance when compared to conventional systems that filter a partition in the table storage without using the additional indexes.

Processor 510 may be, for example, a signal processor, a microprocessor, an application specific integrated circuit (ASIC), or other control and processing logic circuitry for performing tasks including signal coding, data processing, input/output processing, power control, or other functions. Processor 510 may interact with logics 530 that provide partition indexing and filtering services.

Memory 520 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 520 may store a query, a query location, a table, a table location, a partition, a partition location, an entity, an entity location, a name-value pair, a name-value pair location, a value retrieved from a name-value pair, an index, or other information.

Figure 6:
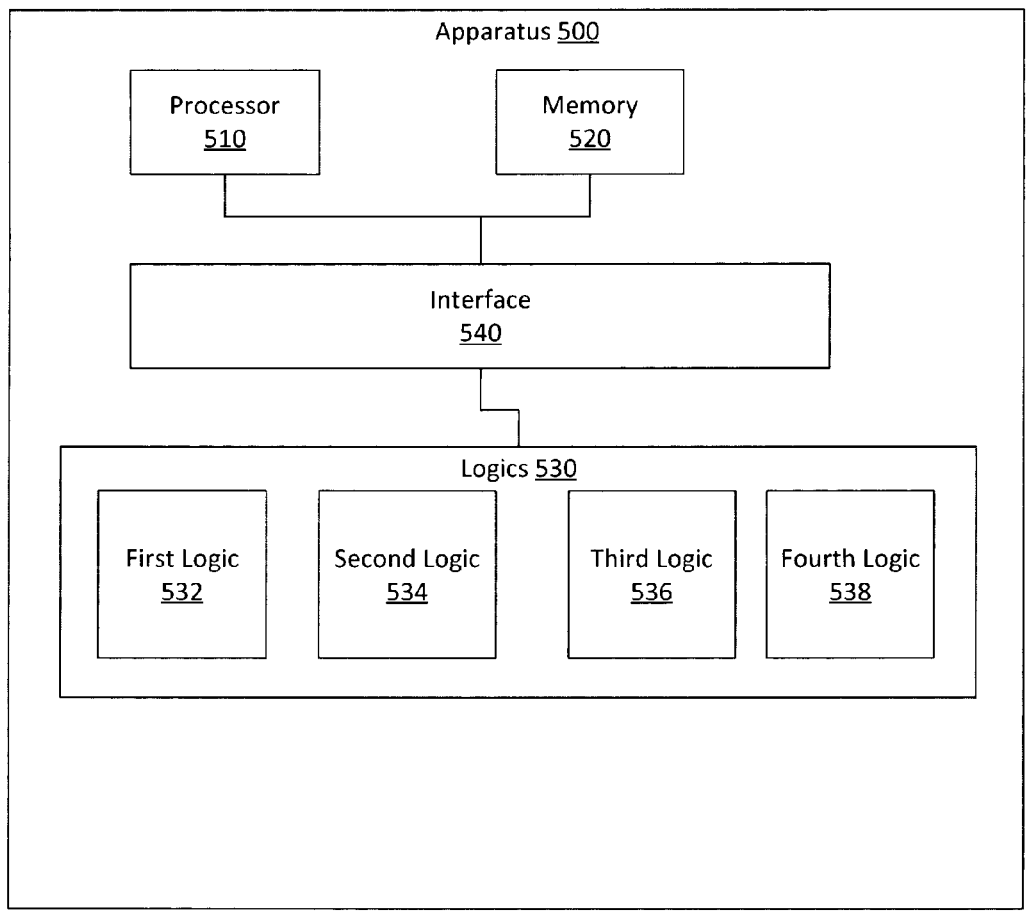
FIG. 6 illustrates an example apparatus for filtering a partition on a specific field using a smart index in memory.

FIG. 6 illustrates another embodiment of apparatus 500. This embodiment of apparatus 500 includes a fourth logic 538. Fourth logic 538 may selectively compress or serialize the partition. Fourth logic 538 may compress or serialize the partition upon determining that the partition is to be copied from the table store to the memory. Fourth logic 538 may compress or serialize the partition at times including before copying the partition to the memory, while copying the partition to the memory, or after copying the partition to the memory. Serializing the partition may include translating a data structure or object state into a format that can be stored a different way (e.g., from BLOB to file) or that can be transmitted a different way (e.g., from records to stream of bits).

Figure 7:
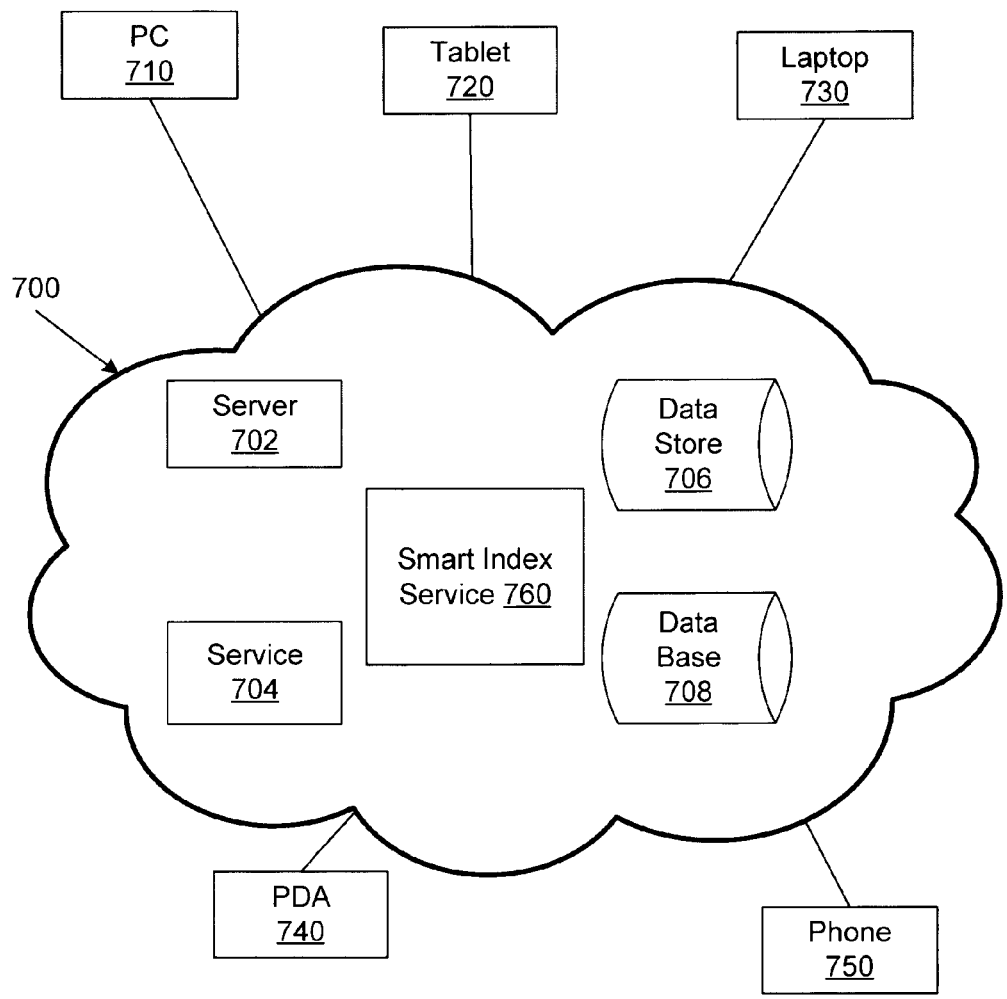
FIG. 7 illustrates an example cloud operating environment in which a smart index in memory that supports filtering a partition on a specific field may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example smart index service 760 residing in the cloud. The smart index service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the smart index service 760.

FIG. 7 illustrates various devices accessing the smart index service 760 in the cloud. The devices include a computer 710, a tablet 720, a laptop computer 730, a personal digital assistant 740, and a mobile device (e.g., cellular phone, satellite phone) 750. It is possible that different users at different locations using different devices may access the smart index service 760 through different networks or interfaces. In one example, the smart index service 760 may be accessed by a mobile device 750. In another example, portions of smart index service 760 may reside on a mobile device 750. Smart index service 760 may perform actions including, for example, routing queries that filter on a specific field to a multi-index shared memory, routing queries that do not filter on a specific field to a table store, selectively copying a collection from a table store to a multi-indexed shared memory, arranging the multi-indexed shared memory based on the collection, producing multiple indexes for the partition in the multi-indexed shared memory, or other actions. In one embodiment, smart index service 760 may perform portions of methods described herein (e.g., method 300, method 400).

Figure 8:
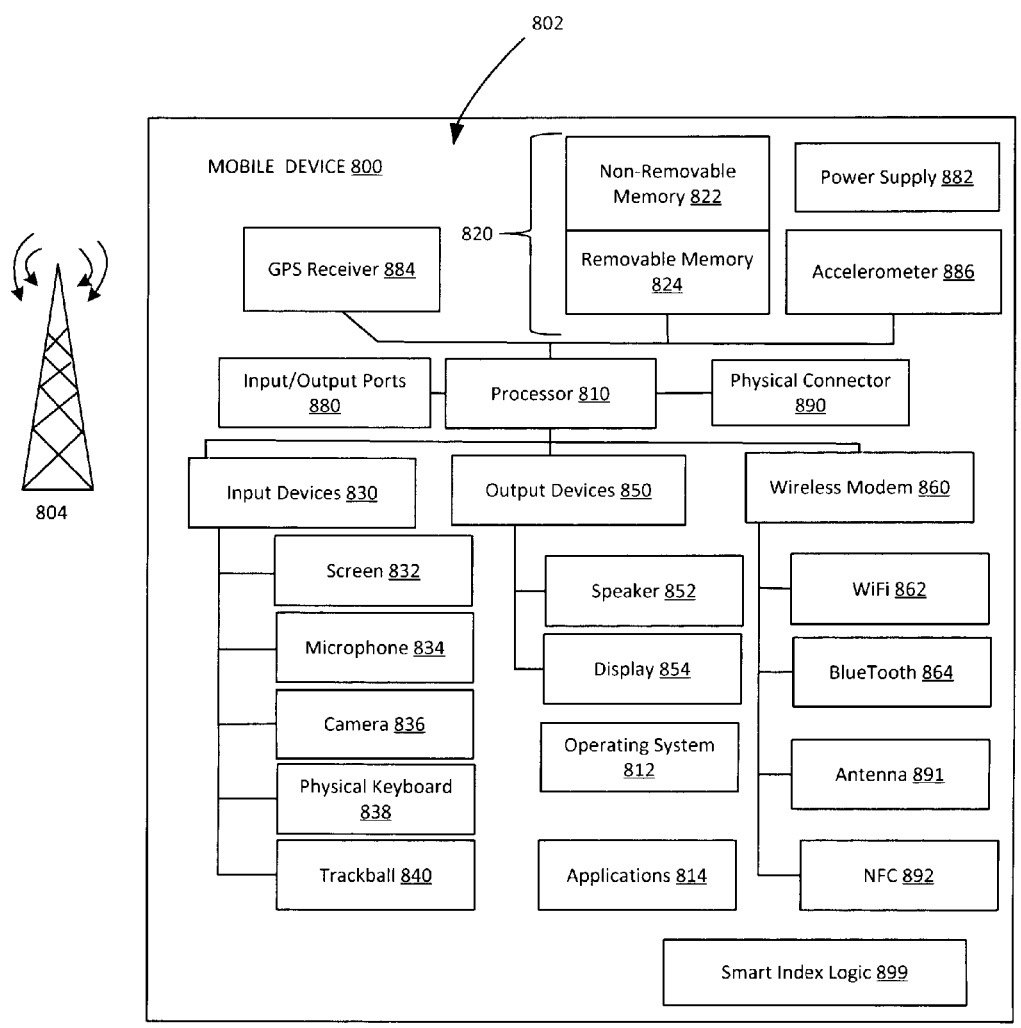
FIG. 8 is a system diagram depicting an exemplary mobile communication device that may interact with a smart index in memory that supports filtering a partition on a specific field.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, application specific integrated circuit (ASIC), or other control and processing logic circuitry) for performing tasks including creating multiple indexes for a collection copied from a table store to a memory, routing queries based on whether they seek to filter on a specific field, selectively replacing a collection that has been copied to a multi-index shared memory, or other action. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include table location data, table organization data, entity data, collection data, partition location data, partition data, partition key data, row key data, index information, multiple index information, specific field query data, context data, web pages, text, images, sound files, video data, or other data sets. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a screen 832 that is touch or hover sensitive, a microphone 834, a camera 836, a physical keyboard 838, or trackball 840. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a smart index logic 899 that is configured to provide a functionality for the mobile device 800. For example, smart index logic 899 may provide a client for interacting with a service (e.g., service 760, FIG. 7). Portions of the example methods described herein may be performed by smart index logic 899. Similarly, smart index logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   identifying a related collection of entities for a first partition of a table using a partition key, the table having multiple partitions, the table storing different entities with different sets of properties, each entity having a partition key that facilitates grouping items into partitions, each entity in the first partition having a same partition key value;
   detecting a query that seeks information from the first partition in the table, the table being arranged according to a table-entity-property organization;
   determining that the query is seeking to filter the first partition on a specific property other than the partition key;
   in response to said detecting and determining, preparing a memory with an index for the specific property associated with the query;
   copying the first partition in the table from a table store into the memory for filtering in the memory; and
   filtering the first partition on the specific property using the index, the first partition being filtered in the memory.

2. The method of claim 1, where filtering the first partition on the specific property proceeds in parallel using two or more indexes available to the memory.

3. The method of claim 1, further comprising:
detecting a second query;
determining that the second query is seeking to filter the first partition on a second specific property other than a key property;
preparing the memory with a second index for the second specific property associated with the second query; and
filtering the first partition on the second specific property using the second index, wherein the first partition is filtered in parallel with the filtering the first partition on the specific property using the index in the memory.

4. The method of claim 1, where a table in the table-entity-property organization comprises a set of entities, where an entity in the table-entity-property organization comprises a set of properties, and where a property in the table-entity-property organization comprises a name-value pair, where the table does not enforce a schema on an entity, where the table can store different entities that have different sets of properties, and where the partition may have different entities with different sets of properties.

5. The method of claim 4, where the entity has a partition key and a row key, where the partition key is used to identify related collections of entities, and where the row key is used as a unique identifier for an entity within the first partition.

6. The method of claim 1, comprising serializing the first partition before, during, or after copying the first partition from the table store into the memory or compressing the first partition before, during, or after copying the first partition from the table store into the memory.

7. The method of claim 1, where the one or more indexes are partition-specific or query-specific.

8. The method of claim 1, where the memory is a structured shared cache, and where the memory is in a different storage apparatus than the table store.

9. The method of claim 1, comprising, upon determining that the query does not seek to filter on a specific property, servicing the query from the table store, and
upon determining that the query seeks to filter on the specific property, and
upon determining that the first partition is already in the memory, servicing the query from the memory.

10. The method of claim 9, comprising preparing the memory so that two or more properties in the first partition can be used as indexes to support the query.

11. The method of claim 9, comprising preparing the memory so that any property in the first partition can be used as an index to support the query.

12. The method of claim 1, comprising selectively updating the first partition in the memory or in the table store.

13. The method of claim 1, where the table is stored in a binary large object (BLOB).

14. A computer-readable storage medium storing computer-executable instructions that when executed by a computer cause the computer to perform a method, the method comprising:
identifying a related collection of entities for a partition of a table using a partition key, the table having multiple partitions, the table storing different entities with different sets of properties, each entity having a partition key that facilitates grouping items into partitions, each entity in the partition having a same partition key value;
detecting a query to the partition,
upon determining that the query does not seek to filter on a specific property in the partition, servicing the query from the table store;
upon determining that the query seeks to filter on a specific property in the first partition other than the partition key:
organizing a structured shared cache with two or more indexes that facilitate filtering the partition;
serializing the partition;
compressing the partition;
copying the partition from the table store into the structured shared cache;
filtering the partition on the specific property using the two or more indexes for the specific property associated with the query, where the filtering proceeds in parallel and is performed in the structured shared cache, and
selectively updating the partition in the structured shared cache or in the table store,
where the table store is arranged according to a table-entity-property organization,
where a table in the table-entity-property organization comprises a set of entities,
where an entity in the table-entity-property organization comprises a set of properties, where a property in the table-entity-property organization comprises a name-value pair,
where a table does not enforce a schema on an entity,
where a table in the table-entity-property organization can store different entities that have different sets of properties,
where an entity has a partition key and a row key,
where the row key is used as a unique identifier for an entity within a partition, and
where the structured shared cache is in a different storage apparatus than the table store.

15. A method, comprising:
identifying a related collection of entities for a first partition stored in a table having multiple partitions using a partition key, the table storing different entities with different sets of properties, each entity having a partition key that facilitates grouping items into partitions, each entity in the first partition having a same partition key value, the table store is organized using a table-entity-property model,
where the table in the table-entity-property model comprises a set of entities,
where an entity in the table-entity-property model comprises a set of properties,
where a property in the table-entity-property model comprises a name-value pair,
where a table in the table-entity-property model does not enforce a schema on an entity,
where each partition of the multiple partitions in the table-entity-property model may have different entities with different sets of properties, each of the different entities having a partition key that facilitates grouping items into at least one of the multiple partitions,
receiving a query;
routing the query as a function of whether the query seeks to filter the partition on one or more specific properties associated with the query, the one or more specific properties not being a key property;
selectively copying the partition from the table store into a memory upon detecting that the query seeks to filter the partition on the one or more specific properties associated with the query;
preparing an index for the memory, where the index facilitates filtering the partition on the one or more specific properties associated with the query, and filtering the partition in the memory on the one or more specific properties associated with the query.

16. The method of claim 15, wherein the method further comprises routing queries that seek to filter on one or more specific properties to the partition in the memory and routing queries that do not seek to filter on one or more specific properties to the table store.

17. The method of claim 16, wherein preparing an index for the memory comprises preparing two or more indexes for the partition, where the two or more indexes that are prepared are selected as a function of the partition or as a function of the query.

18. The method of claim 17, wherein the filtering the partition in the memory comprises filtering the partition in parallel in the memory using the two or more indexes.

19. The method of claim 18, wherein preparing an index comprises selectively updating the partition in the memory or in the table store.

20. The method of claim 19, comprising selectively compressing the partition or serializing the partition upon determining that the partition is to be copied from the table store to the memory.

* * * * *